United States Patent [19]

Peyret

[11] Patent Number: 5,423,106
[45] Date of Patent: Jun. 13, 1995

[54] WINDSCREEN WIPER DEVICE WITH SEPARABLE HINGED JOINT

[75] Inventor: Xavier Peyret, Clermont-Ferrand, France

[73] Assignee: Valeo Systemes d'Essuyage, Montigny-le-Bretonneux, France

[21] Appl. No.: 92,330

[22] Filed: Jul. 15, 1993

[30] Foreign Application Priority Data

Jul. 15, 1992 [FR] France ................. 92 08704

[51] Int. Cl.⁶ ............ B60S 1/32; F05D 7/10
[52] U.S. Cl. .................. 16/260; 16/254; 15/250.31; 15/250.35; 403/320; 403/350
[58] Field of Search ........... 15/250.35, 250.34, 250.31, 15/250.42, 250.19; 403/320, 350, 367, 374, 409.1, 160–163, 157; 16/260, 267, 268, 254, 257, 259

[56] References Cited

U.S. PATENT DOCUMENTS

| | | | |
|---|---|---|---|
| 770,595 | 9/1904 | Lovette | 16/260 |
| 2,353,208 | 7/1944 | Whitted | 15/250.35 |
| 3,416,185 | 12/1968 | Peterson | 16/260 |
| 4,170,804 | 10/1979 | Scotcher | 15/250.35 |
| 4,856,137 | 8/1989 | Palu | 15/250.31 |
| 5,222,274 | 6/1993 | Schor | 15/250.35 |

FOREIGN PATENT DOCUMENTS

| | | | |
|---|---|---|---|
| 209276 | 1/1987 | European Pat. Off. | 15/250.35 |
| 1265101 | 5/1961 | France | 15/250.34 |

*Primary Examiner*—David A. Scherbel
*Assistant Examiner*—Gary K. Graham

[57] ABSTRACT

The invention proposes a windscreen wiper device, especially for a motor vehicle, comprising a component forming a windscreen wiper arm which is articulated to a component forming a drive head by means of an hinge pin associated with a first of these two components and at least one pin section of which, having a cylindrical section, is received within a complementary bearing section formed in the second of the two components and which comprises a concave semi-cylindrical surface portion into which the pin section may be introduced in a direction perpendicular to the hinge pin, and retention means comprising co-operating shapes which prevent the detachment of the section of the hinge pin from the bearing section the invention being characterized in that the retention means comprise a retention rod which extends axially in the extension of the section of the hinge pin and a retention lug formed on the second component and which extends opposite the retention rod so as to cooperate therewith.

8 Claims, 2 Drawing Sheets

WINDSCREEN WIPER DEVICE WITH SEPARABLE HINGED JOINT

FIELD OF THE INVENTION

The present invention relates to a windscreen wiper device, suitable for a motor vehicle.

The invention more particularly relates to a windscreen wiper device of the kind comprising a component forming a windscreen wiper arm, which is articulated on another component forming the drive head, for movement about an articulation axis comprising a hinge pin which extends in a direction substantially perpendicular to the longitudinal direction of the windscreen wiper.

The hinge pin is associated with a first of the two components and comprises at least one section having a cylindrical section, which is received in a complementary bearing section formed in the second of the two components and which comprises a semi-cylindrical surface portion in which the section of the hinge pin may be introduced in a direction perpendicular to the hinge pin, the device comprising an elastic member which keeps the section of the hinge pin in contact with the semi-cylindrical surface portion, as well as retention means comprising co-operating shapes which prevent the detachment of the section of the hinge pin from the bearing section.

BACKGROUND OF THE INVENTION

One embodiment of such a hinge pin device is illustrated in French Published Patent Application No. 2596711, in which the hinge pin section is substantially semi-cylindrical with a flat face turned towards the interior of the windscreen wiper arm, and in which the bearing section comprises an insertion recess which has an internal section with semi-cylindrical contours and a diameter substantially equal to that of the section of the hinge pin, and a section open towards the exterior delimited by flat faces which are separated by a distance less than the diameter of the section of the hinge pin and slightly greater than the dimension thereof measured perpendicular to the flat face, the section of the hinge pin being mounted in the interior section of the recess.

Such a design is advantageous in that it enables the two components to be produced economically by moulding from plastic material, but it is not entirely satisfactory from the operational point of view insofar as there is a substantial risk of the section of the hinge pin escaping from its recess.

DISCUSSION OF THE INVENTION

In order to deal with this difficulty, the present invention proposes a windscreen wiper device of the above-mentioned kind, in which the retention means comprise a retention rod which extends axially into the extension of the section of the hinge pin, and a retention lug formed on the second component and which extends opposite the retention rod so as to cooperate therewith.

According to preferred characteristics of the invention:

the retention lug may cooperate with a surface portion of the second component to delimit a slot for the introduction of the retention rod, the diameter of the retention rod being greater than the width of this slot and the retention rod comprising a flat surface so as to allow the introduction of the rod into the slot, and thus the introduction of the section of the hinge pin into the bearing section, only for a determined relative angular position of these two components;

the bearing section may comprise two parallel plane guideway sections which extend the semi-cylindrical surface portion and which define the direction of introduction of the section of the hinge pin into the bearing section, the retention lug extending transversally as a projection from one of these two guideway portions towards the other guideway portion with which it delimits the slot;

the retention rod can be eccentric with respect to the section of the hinge pin; the articulation and retention means of the two components may have a symmetry of construction with respect to a median plane perpendicular to the hinge pin;

the hinge pin may comprise two sections disposed symmetrically on both sides of the plane of symmetry and the retention means are disposed between the two sections of the hinge pin;

the first component may comprise two parallel lateral cheeks between which the hinge pin extends;

the second component may comprise two lateral faces designed to be accommodated between the lateral cheeks of the first component;

the two components can be made by moulding from plastics material; and the first component is preferably the drive head, and the windscreen wiper arm comprises the second component.

A preferred embodiment of the invention will now be described, by way of example only, with reference to the attached drawings.

DESCRIPTION OF A PREFERRED EMBODIMENT OF THE INVENTION

Figure 1:
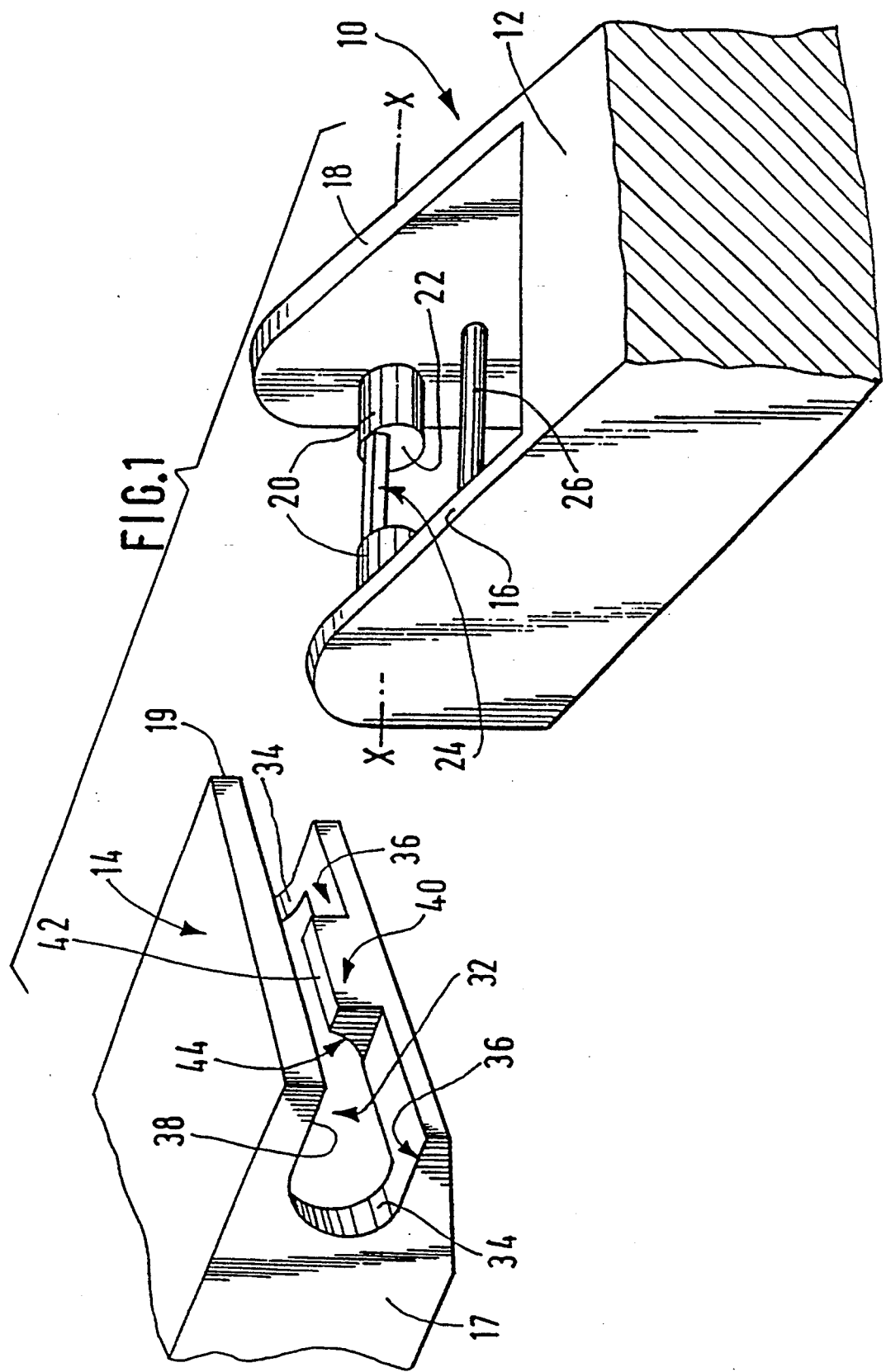
FIG. 1 is a diagrammatic perspective view illustrating the two end portions of the two essential parts of a windscreen wiper device constructed in accordance with the teachings of the invention.
Figure 2:
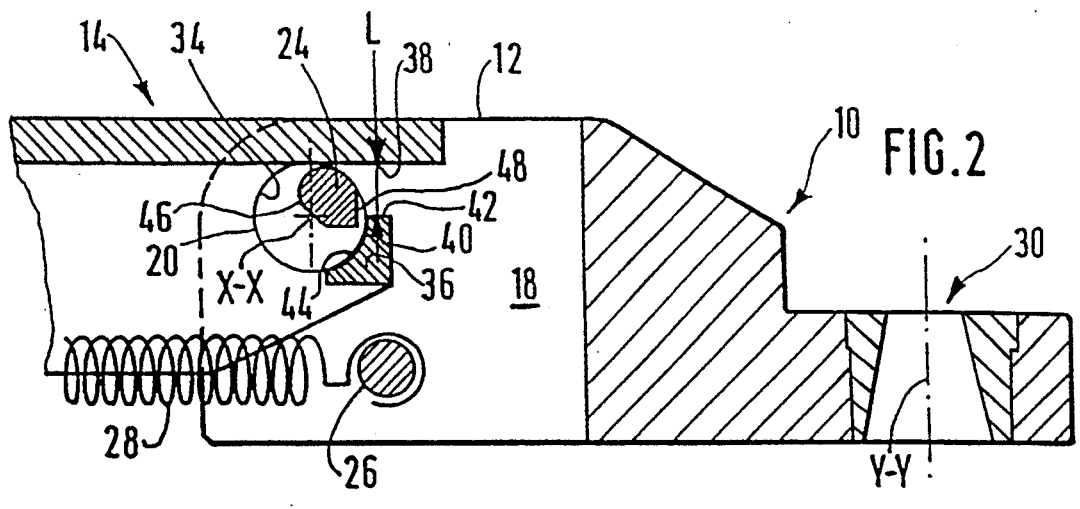
FIG. 2 is a view in longitudinal section through a plane of median symmetry and perpendicular to the hinge pin of the two components illustrated in FIG. 1 and on which the two components are represented in the normal operating position of the windscreen wiper.

FIGS. 1 and 2 show a drive head 10 for a windscreen wiper, at the end 12 of which the end portion 14 of a windscreen wiper arm is pivotally mounted for movement around an axis X—X.

The articulation of the windscreen wiper arm 14 with respect to the drive head 10 is performed in the following manner.

The end portion 12 of the drive head 10 comprises two parallel lateral cheeks 16 and 18, between which two coaxial cylindrical sections 20 constituting the actual hinge pin extend.

The two sections of the hinge pin 20 end with opposite radial faces 22, between which a retention rod 24 axially extends.

The drive head 10 also comprises a bar 26 onto which is hooked a helical draw spring 28, the bar 26 extending between the cheeks 16 and 18 parallel to the axis X—X.

The drive head 10 also comprises means 30 (FIG. 2) for connecting it to a drive shaft in a rocking motion around an axis Y—Y substantially perpendicular to the hinge pin X—X.

The drive head 10 is made for example by moulding from plastics material.

The end portion 14 of the windscreen wiper arm is made in the form of a solid piece moulded from plastic material, the parallel lateral faces 17 and 19 of which are designed to cooperate with the internal faces of the cheeks 16 and 18.

The portion 14 comprises a recess 32 which delimits two sections of self-aligning bearings 34, designed symmetrically with respect to the median plane of the windscreen wiper arm and opposite sections 20 of the hinge pin.

Each bearing section 34 is essentially formed by a concave, semi-cylindrical surface portion, which is designed to cooperate with a corresponding section of the hinge pin 20 in order to ensure a pivotal movement around the geometrical axis X—X.

The housing or recess 32 is extended longitudinally, from the semi-cylindrical surface portion 34 by two parallel and opposite plane guideways 36 and 38.

The two guideways 36 and 38 are parallel to one another and parallel to the geometrical axis of the concave, semi-cylindrical surface portion 34.

Given the complementary nature of shapes and dimensions of the sections 20 of the hinge pin and the two bearing sections 34, it is possible to introduce sections of the hinge pin 20 to bring them into contact with the concave surface portions 34 in a direction perpendicular to the hinge pin X—X.

In the normal operating position illustrated in FIG. 2, the external, convex, cylindrical surface of the sections of the hinge pin is kept in contact with the concave, semi-cylindrical surface 34 by the action of a helical draw spring 28, which is disposed between the drive head 10 and the windscreen wiper arm 14.

The end portion 14 of the windscreen wiper arm also comprises a retention lug 40, which extends transversally as a projection from the plane guideway portion 36 towards the plane guideway portion 38.

The retention lug is integrally moulded and comprises an upper plane face 42 which extends parallel to the plane guideway 38 and which with the latter delimits a slot of width L.

The retention lug 40 also comprises an internal face which is a concave cylindrical surface portion 44 centered on the axis of the semi-cylindrical portion 34.

As can be ascertained from the drawings the retention rod 24 is eccentric with respect to the axis X—X of the sections 20 of the hinge pin.

The retention rod 24 has a circular general section, the diameter of which is larger than the width L of the slot.

However, the transversal section of the retention rod 24 is not entirely circular. In fact, the retention rod 24 comprises a first flat surface 46, which is such that the height "h" of the transversal section of the retention rod, measured along the normal to this flat surface, is slightly less than the width L of the slot so as to allow the introduction of the retention rod 24 into the slot when the windscreen wiper arm 14 occupies a determined angular position with respect to the drive head 10.

Figure 3:
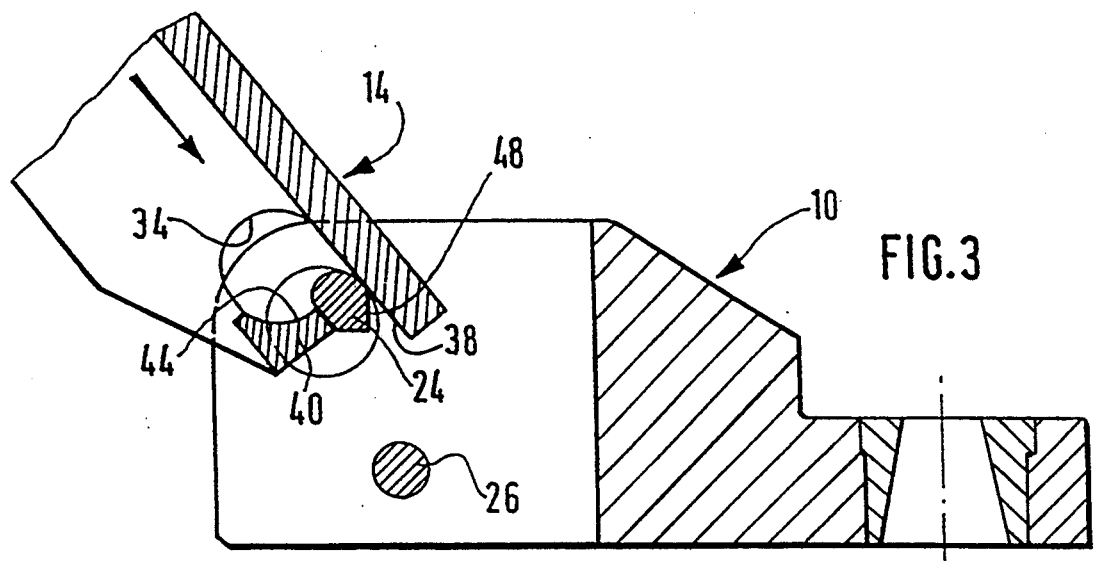
FIG. 3 is a similar view to that in FIG. 2 illustrating the assembly phase of the two components.

This position is illustrated in FIG. 3 and corresponds to the assembly, or dismantling, position of the windscreen wiper arm 14 on the drive head 10.

Figure 4:
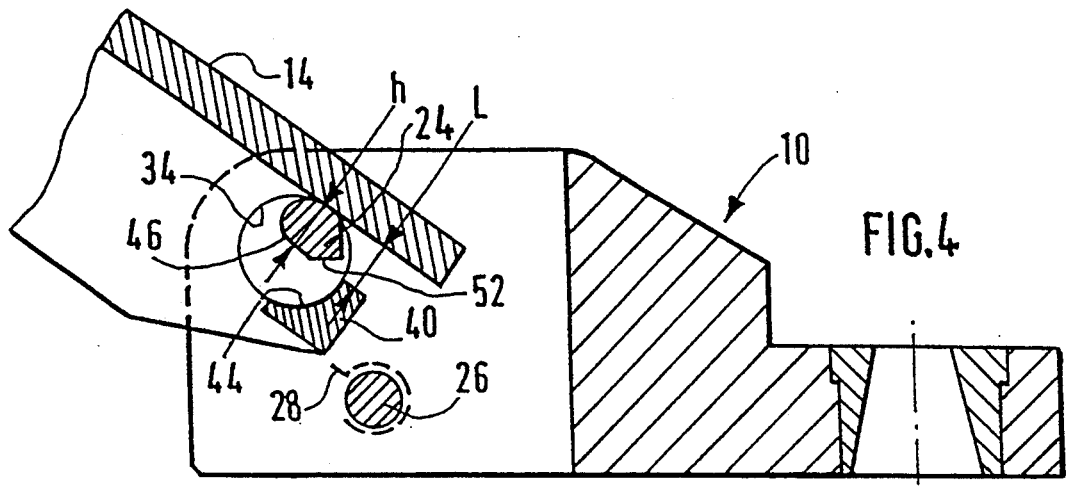
FIG. 4 is a view similar to that in FIG. 2 illustrating the two components in a stable position known as the maintenance position.

In fact, when the windscreen wiper arm 14 occupies the determined angular position illustrated in FIG. 3, it is possible to introduce the retention rod 24 into the slot delimited by the opposite faces 42 and 38 and then, at the end of the introduction, to bring the sections 20 of the hinge pin to rest in the bearing portions (FIG. 4).

From this position of introduction, it is then possible to pivot the windscreen wiper arm 14 around the axis X—X, in the anti-clockwise direction when studying FIG. 3, to bring it into its normal operating position illustrated in FIG. 2.

After hooking into place the helical draw spring 28, the sections 20 of the hinge pin are received by the semi-cylindrical bearing portions 34.

An accidental detachment of the sections 20 from the bearing portions 34 is impossible because of the presence of the retention lug 40, which extends transversally opposite a retention face 48 formed by a second flat surface formed on the retention rod 24.

FIG. 4 illustrates the position of equilibrium of the windscreen wiper arm 14 on the drive head 10 corresponding to a rocking position thereof also called the maintenance position, in which it is possible for example to proceed with the replacement of the wiper blade (not shown).

In this position, any accidental detachment of the sections 20 of the hinge pin from the bearings 34 is also impossible as the retention lug 40 extends in front of a relative opposite retention portion formed by a third flat surface 52.

What is claimed is:

1. A windscreen wiper device, comprising one component forming a windscreen wiper arm articulated to another component forming a drive head, a hinge pin having a longitudinal axis and at least one cylindrical hinge pin section attached to one of the two components, the at least one cylindrical hinge pin section being received in a complementary bearing section formed in the component to which the hinge pin is not attached which component bearing section has a concave semi-cylindrical surface within which the cylindrical hinge pin section is mounted in a direction perpendicular to said hinge pin cylindrical section longitudinal axis, said bearing section also having two parallel plane guideway surfaces joined with said concave semi-cylindrical surface and a retention lug formed on one of said plane guideway surfaces, extending transversely therefrom in a direction toward said other plane guideway surface to establish a width therebetween; retention means for preventing the detachment of the section of the hinge pin from the bearing section, wherein the retention means has an elongated retention rod having a lengthwise axis and a dimension greater than the width established between said lug and said other plane guideway surface, said rod joined axially to the cylindrical hinge pin section, wherein the retention lug has a concave semi-cylindrical surface surface that complements said cylindrical hinge pin section to provide a complement to the bearing section, the retention rod having a flat surface which allows the rod to be received in the slot to mount the cylindrical section of the hinge pin in the bearing section only for a predetermined relative angular position of the two components.

2. A windscreen wiper device according to claim 1, wherein said retention rod lengthwise axis is offset with respect to the hinge pin longitudinal axis.

3. A windscreen wiper device according to claim 1, wherein said retention means of the two components have a symmetry of construction with respect to a median plane which lies perpendicular to the hinge pin.

4. A windscreen wiper device according to claim 1, wherein said hinge pin sections comprise two sections disposed symmetrically on both sides of the plane of symmetry, and wherein said retention means are disposed between the two sections of the hinge pin.

5. A windscreen wiper device according to claim 4, wherein the component to which said cylindrical hinge pin is attached comprises two parallel lateral cheeks between which the hinge pin extends.

6. A windscreen wiper device according to claim 5, wherein said other component comprises two parallel lateral faces adapted to be received between said lateral cheeks of the first said component.

7. A windscreen wiper device according to claim 1, wherein said two components are moulded from plastics material.

8. A windscreen wiper device according to claim 1, wherein said drive head of the windscreen wiper constitutes the component to which said cylindrical hinge pin is attached.

* * * * *